Patented Feb. 27, 1940

2,191,949

UNITED STATES PATENT OFFICE 2,191,949

UREA-FORMALDEHYDE MOLDING COMPOSITION AND PROCESS OF FORMING

Robert W. Belfit, Watertown, Conn., assignor, by mesne assignments, to Plaskon Company Incorporated, Toledo, Ohio, a corporation of Delaware No Drawing. Continuation of application Serial No. 431,063, February 24, 1930. This application April 4, 1932, Serial No. 603,215

11 Claims. (Cl. 260—69)

This invention relates to molding compounds and products formed from formaldehyde-urea condensation products and to processes of forming such compounds and products.

Instead of formaldehyde, polymers of formaldehyde, or the aliphatic aldehydes, may be employed; also, suitable substitutes for urea may be employed, as for example, cyanamid ($NCNH_2$), guanidine ($NHC(NH_2)_2$), and/or active derivatives thereof.

A condensation product of the character mentioned above may be appropriately termed a condensation product of the formaldehyde-urea type.

One of the objects of the invention is to form a molding compound of good-flow properties and a molded product which may be buffed to give a high luster and which has a high resistance to moisture. A further object is to provide a method by which a satisfactory molding compound may be produced with economy and saving in the amount of materials employed. Other objects and advantages will appear as the description proceeds.

Finished molded articles of clear, brilliant color may be produced. Any desired color may be used, and soft pastel shades may be readily produced.

To form a molding compound or molded product having the desired characteristics of hardness, luster, resistance to moisture, good-flow properties, etc., with economy in the use of urea, formaldehyde and certain other materials used, I prefer to use the following improved process.

An initial condensation liquid is first produced with urea and a formaldehyde solution to which has been added an alkali to bring the pH value to 5.5 or higher. An excellent pH value is 6.0-7.0, i. e., still slightly acid in character. A value of 8.0 (slightly alkaline) may be used, if desired. Preferably, this mixture is heated under superatmospheric pressure at temperatures from 110° C. to 120° C. for a suitable length of time. Usually from 1 to 3 hours (or less) will be sufficient. Pressure (superatmospheric) may range from about 10 pounds to a much higher pressure. If desired, the resultant solution or liquid may be filtered. After an initial condensation product in solution in formaldehyde and water has been prepared, it is preferred to mix therewith a minor percentage of thiourea; then mix with the solution a suitable fibrous filler, and a dye, if desired. The mixture is then dried at a temperature preferably below 100° C. in such manner as to prevent any substantial reaction. The material is ground to form a molding powder, preferably passing a 20 or 30 mesh screen.

The fibrous filler employed preferably is fluffed paper, or paper pulp, for example such as alpha paper fluff or alpha flock.

Instead of employing superatmospheric pressure in producing the initial condensation product, one may employ a reflux condenser at atmospheric pressure, which will require a longer time for the reaction to take place. The alkali employed has the effect of preventing the condensation from proceeding too far during the initial reaction.

A preferred example of the process, as a whole, may be stated as follows:

Prepare the following mixture:

(1) Formaldehyde solution (36.5% $CH_2O$ by weight) 2050 grams.

(2) One-half normal potassium hydroxide solution—50 grams.

(3) Urea—750 grams.

The alkali solution changes the pH value of the formaldehyde solution to approximately 7.

The ratio between the formaldehyde and urea is two moles of formaldehyde to one of the urea. The urea may be dissolved in the formaldehyde before mixing with the other materials. The mixture is heated in a steam-jacketed digester, preferably at a temperature of from 95-120° C. A desirable range is about 105-115° C. Ordinarily, the internal pressure in the digester ranges from 15-45 pounds at the temperatures last mentioned. At the temperatures given, an initial product may be satisfactorily formed in one-half to three hours.

The urea-formaldehyde condensation product thus formed remains in solution in the formaldehyde and water. Its solids, as determined at 105° C., amount to about 50-55% of the solution. The solution will remain clear and liquid for months. It is not necessary to add any water or alcohol to the solution before the incorporation of the fillers, as the latter can be readily whipped in with a mechanical stirrer.

Having produced a solution of a condensation product of the urea-formaldehyde type, one may proceed to produce the molding compound as follows:

Six or seven parts thiourea may be dissolved in 93-94 parts of the solution last described, and a minor proportion of suitable coloring matter introduced. A filler is then incorporated, for example, 18-21 parts of fluffed paper pulp such as alpha paper fluff or alpha flock, and is stirred thoroughly into the solution.

For example, 375 grams of the solution above described, 25 grams of thiourea, 75 grams of alpha paper fluff, 2 grams of C. P. Lithol Toner Deep and 1 gram of C. P. titanium oxide may be mixed as described. The paper may be beaten into the solution by means of a motor driven stirrer.

The wet material is then dried in any suitable manner, care being taken to keep the temperature below 100° C., and preferably from 80–90° C. Usually the mixture may be dried within a couple of hours' time by circulating heated air in contact with the mixture in an oven. After the drying operation, the material has the general shape of pop corn. It is quite hard but readily broken up with the fingers.

In producing the compound, care is taken to preserve the mixture against reaction, but it constitutes a potentially reactive molding compound, which will react upon heating in the dies.

The dried material may then be ground in any suitable manner, for example, in a ball mill until it passes a 28 mesh sieve. The size of the granules is not of very great importance, however, except that small sized granules are readily introduced into the mold and measured in quantities. Instead of incorporating the thiourea in the solution, as heretofore described, a dried product may be produced as described, with the exception that the thiourea is omitted, and the thiourea added and ground into the mixture in the ball mill.

Should the molding powder not have sufficient flowing properties at normal temperatures and pressures, an additional amount of thiourea, say, 5–10%, may be added. The addition of the extra thiourea causes the molding powder to flow more freely, but it is usually unnecessary to add it.

Where desirable, plasticizers such as di-butyl phthalate or castor oil may be incorporated.

Likewise, where desired, natural resins and waxes, such as gum mastic, shellac dammar, copal, resin, elemi, and the like, may be employed.

The molding powder is molded in heated molds, preferably at a temperature considerably in excess of 100° C. and under a pressure of 1500 to 3000 lbs. per sq. in. For ordinary small articles, a period of six minutes suffices to convert the material to an infusible, substantially insoluble condition.

In molding a product of the character described, the material flows readily in the mold and the molded product has a polished surface and possesses a high degree of strength.

A molded product produced in the manner stated will not absorb water readily. It was found, for example, that a sample tested, immersed in water, showed an absorption of about 3% in 25 hours and about 8.8% in 160 hours.

Articles may be molded ordinarily in from 2 to 20 minutes, depending upon the size.

Any suitable alkali may be employed to retard the reaction in producing the urea-formaldehyde condensation product, such as calcium hydroxide, potassium hydroxide, magnesium hydroxide, sodium carbonate, or mixtures.

If a translucent product is desired it is preferred to use a dye in coloring the molding powders. Pigments may be used if an opaque molded product is desired. Dry pigments may be satisfactorily added to the final molding powder in the dry state by grinding the mixture in a ball mill.

Any suitable filler, such as, for example, wood flour, asbestos, etc., may be used. It is preferred, however, to use paper pulp because of its high purity and because it does not discolor the final product but allows it to be translucent as well as enhances its strength.

The molded product produced in the manner described is hard and translucent and, when buffed, develops a high luster.

The procedure stated in the first example given above, may be varied to incorporate a larger proportion of fibrous filler. For example, the potassium hydroxide solution there mentioned may be replaced by 30 cc. of normal aqueous sodium hydroxide solution. The mixture may then be subjected to heat in a steam-jacketed digester at a temperature of 200° F. to 250° F. The internal pressure developed in the digester ordinarily ranges from 30–40 lbs. gauge pressure and the condensation may be effected in about one-half hour. This gives a solution containing about 50% solids, determined at 135° C. The solution will remain clear for a long time, say a month. One may proceed to form a molding compound as follows:

Dissolve 22.5 grams of thiourea in 375 grams of the solution last described; introduce into the solution 3 grams of suitable coloring material, say 2 grams of Imperial Color Works C. P. Lithol Toner Deep and one gram of pure white titanium oxide; and then stir thoroughly into the solution 225 grams of ground paper flock. This may be of 40 mesh–200 mesh. The product may be dried and ground, as described above. A molding powder produced in this manner may contain about 51% of fibrous filler; and it contains about 5.1% of thiourea. This enables a molding compound of reduced cost to be produced.

A less concentrated urea formaldehyde condensation product solution may be used where desired. For example, 75 grams of urea are mixed with 205 grams of formaldehyde (36.5 by weight) and with 136 cc. of calcium hydroxide solution (N/20). This mixture is heated in a pressure flask at 115° to 120° C. from about 1½ hours to 4 hours under a gauge pressure of 11½ pounds per square inch. By weight the above mixture of urea and formaldehyde contains each in equal quantity. As the molecular weight of the urea is 60 and the molecular weight of the formaldehyde is 30, there are two moles of formaldehyde for each mole of urea. The resultant solution from this initial condensation is a cloudy liquid which may or may not be filtered. To the solution is now added a dye or pigment and a paper pulp filler in the following proportions. Water and alcohol are also added as follows:

| | Grams |
|---|---|
| Urea-formaldehyde condensation product | 375 |
| Paper pulp | 50 |
| Natural red fast dye | 1 |
| Water | 150 |
| Denatured alcohol | 50 |

The ingredients are thoroughly mixed and the mixture is then dried at a temperature below 100° C. and preferably at 90° C., the drying operation being conducted first over a water bath and finally in an oven with fan circulation. The mass is then ground until it will pass through a 35 mesh screen. The resulting molding powder contains approximately 30% of paper filler.

Thiourea, preferably in powdered form, is then added to the powdered material in the proportion of 10 grams of thiourea to 90 grams of molding powder. The powder thus mixed with thiourea is placed in the molds and subjected to temperature and pressure, the steam pressure for heating the molds or platens being 40 to 100 pounds, and the pressure being between 1500 and 3000 pounds per square inch.

The use of plasticizing agents has been suggested above. If desired, about 2% of mixed vinyl acetate and vinyl chloride polymerized compounds may be used in connection with other plasticizing agents, or independently; also, varying percentages of cellulose acetate may be introduced, if desired. The use of as small an amount as 2% vinyl compound reduces very materially the shrinkage of the molded product.

Proportions of formaldehyde and urea may be varied in forming the urea-formaldehyde condensation product. If desired, the product may be formed by using one part of urea and five or six parts of formaldehyde. After distillation, a clear, thick, viscous liquid remains which may be employed as a base for the production of a molding compound in the manner described.

The percentage of thiourea employed may vary considerably. This substance greatly improves the flow of the materials in the mold and also very greatly improves the water-proof characteristic of the molded product.

This application is a continuation of my application Serial No. 431,063, filed February 24, 1930, entitled "Molding compounds and processes in forming."

The foregoing detailed description has been given for clearness of understanding only, and no unnecessary limitations should be understood therefrom, but the appended claims should be construed as broadly as permissible, in view of the prior art.

I claim:

1. A process of producing a molding composition which comprises: heating a substantially neutral mixture of urea and aqueous formaldehyde solution in proportions of not substantially less than two moles of formaldehyde to one mole of urea and thus producing a solution of an initial urea-formaldehyde condensation product of stable character; and producing a dry molding composition from said second mentioned solution, a fibrous filler, and a minor portion of thiourea, while keeping the thiourea and condensation product in condition to react with each other when pressed in heated molds, said substances being mixed and treated by steps which include mixing the second-mentioned solution and the fibrous filler and drying the mixture.

2. The process stated in claim 1 as practiced by mixing the thiourea as well as the filler with said second-mentioned solution and drying such mixture at a temperature sufficiently low to keep the thiourea and the condensation product in condition to react with each other when pressed in heated molds.

3. The process stated in claim 1 as practiced by first mixing said second-mentioned solution with the filler, drying such mixture, and then mixing the thiourea with such dried mixture.

4. The process stated in claim 1 as carried out by continuing the heating only until said second-mentioned solution contains about 50% to 55% solids as determined at 105° C.

5. The process stated in claim 1 as carried out by dissolving the thiourea in said second-mentioned solution and then mixing the solution with the fibrous filler and drying the mixture without reacting the thiourea.

6. The process of producing a dry molding composition containing thiourea and an initial urea-formaldehyde condensation product in potentially re-active condition, which comprises: producing an aqueous aldehyde solution of an initial urea-formaldehyde condensation product; mixing such solution, a fibrous filler, and a minor portion of thiourea and drying the mixture at a temperature sufficiently low to keep the thiourea and the condensation product in condition to react with each other when pressed in heated molds.

7. A process of producing a dry molding composition containing thiourea and an initial urea-formaldehyde condensation product in potentially re-active condition, which comprises: heating a substantially neutral mixture of urea and aqueous formaldehyde solution in the proportions of about two moles of formaldehyde and one mole of urea and thus producing a stable solution of an initial urea-formaldehyde condensation product; and producing a dry molding composition from said second-mentioned solution, a fibrous filler, and a minor portion of thiourea, while keeping the thiourea and condensation product in condition to react with each other when pressed in heated molds, said substances being mixed and treated by steps which include mixing the second-mentioned solution and the fibrous filler and drying the mixture.

8. The process stated in claim 1 as carried out by dissolving the thiourea in said second-mentioned solution, then mixing the solution with the fibrous filler and drying the mixture without reacting the thiourea, and comminuting the dried mixture.

9. Process of preparing a moldable composition comprising preparing an aqueous solution of a urea formaldehyde condensation product, adding a filler, drying, comminuting, and mixing a minor amount of pulverulent thiourea therewith.

10. A process of producing a molding composition which comprises: heating a substantially neutral mixture of urea and aqueous formaldehyde solution in proportions of not substantially less than two moles of formaldehyde to one mole of urea and thus producing a solution of an initial urea-formaldehyde condensation product of stable character; and producing a dry molding composition from said second mentioned solution and a minor portion of thiourea, while keeping the thiourea and condensation product in condition to react with each other when pressed in heated molds, said substances being mixed and treated by steps which include mixing the second-mentioned solution and the thiourea and drying the mixture at a temperature sufficiently low to keep the thiourea and the condensation product in condition to react with each other when pressed in heated molds.

11. In the manufacture of improved molding compositions, the process which comprises adding thiourea to an aqueous solution of an initial reaction product of urea and formaldehyde, drying at a temperature and under conditions insufficient to produce substantial reaction between said thiourea and said initial reaction product, and recovering the dry physical admixture of thiourea and initial condensation product thus obtained.

ROBERT W. BELFIT.